United States Patent [19]

Effenberger

[11] E Patent Number: Re. 32,873

[45] Reissued Date of Patent: Feb. 21, 1989

[54] APPARATUS FOR GRINDING AND LAPPING ANNULAR SEALING FACES

[76] Inventor: Effenberger Ranko F. F., Zum Wibbelrusch 6, 5160 Duren, Fed. Rep. of Germany

[21] Appl. No.: 8,597

[22] Filed: Jan. 29, 1987

Related U.S. Patent Documents

Reissue of:

[64] Patent No.: 4,549,373
Issued: Oct. 29, 1985
Appl. No.: 705,869
Filed: Feb. 28, 1985

U.S. Applications:

[63] Continuation of Ser. No. 555,556, Nov. 28, 1983, abandoned.

[30] Foreign Application Priority Data

Feb. 17, 1983 [DE] Fed. Rep. of Germany ..... 8303975

[51] Int. Cl.[4] ..... B24B 15/02

[52] U.S. Cl. ..... 51/241 A

[58] Field of Search ..... 51/241 A, 241 VS, 241 B, 51/241 S, 241 R, 119, 120

[56] References Cited

U.S. PATENT DOCUMENTS 2,572,485 10/1951 Hunter et al. ..... 51/120
2,674,069 4/1954 Bauer ..... 51/120
2,723,512 11/1955 Gibson et al. ..... 51/120
4,287,688 9/1981 Jensen ..... 51/241 VS

FOREIGN PATENT DOCUMENTS 94223 11/1983 European Pat. Off. .
733899 4/1943 Fed. Rep. of Germany .
1103805 3/1961 Fed. Rep. of Germany .
2652292 5/1977 Fed. Rep. of Germany .

OTHER PUBLICATIONS

1974 Brochure "Hauerwas Dopplex-Mobil".
Decision of the German Patent Office in the Cancellation Proceeding Involving German Utility Model Registration No. 83 03975.9.

*Primary Examiner*—Roscoe V. Parker
*Attorney, Agent, or Firm*—Staas & Halsey

[57] ABSTRACT

In an apparatus for grinding and lapping annular sealing faces (25) in valves, slides and the like, a driven tool plate (4) carries freely rotable grinding and lapping heads (21) of which the axes are parallel to the rotary axis of the tool plate (4). In an eccentric bearing hole (15) of the tool plate (4), there is a circular bearing plate (10) which is rotable relatively to the tool plate (4) and can be securely connected in the desired rotary position to the tool plate (4). A drive pin (5) is eccentrically connected to the bearing plate (10) for rotation therewith (FIG. 3).

16 Claims, 3 Drawing Sheets

3
20
4
18
13
12
11
8
9
7
10
17
26
15a
a
14
5
6
21
20

8
0
01
19
3
5
15
10
26
21

APPARATUS FOR GRINDING AND LAPPING ANNULAR SEALING FACES

Matter enclosed in heavy brackets [ ] appears in the original patent but forms no part of this reissue specification; matter printed in italics indicates the additions made by reissue.

This application is a continuation of application Ser. No. 555,556, filed Nov. 28, 1983, and now abandoned.

The invention relates to an apparatus for grinding and lapping annular sealing faces in valves, slides and the like, comprising a mounting securable to the workpiece and having on one side a drive and on the other side a rotatable tool plane which is coupled to the drive by a transmission element and carries a series of freely rotatable grinding or lapping heads with axes parallel to the tool plate axis, the heads being radially adjustable relatively to the tool plate.

Such apparatuses are used particularly to grind and lap the sealing faces in valves, slides, valve plates, slide wedges, slide plates and flanges in their built-in condition. It is known that with the rotation of the tool plate such grinding or lapping heads are rotated by frictional forces acting upon them, if said frictional forces lead to a positive or negative moment with respect to the axes of said heads. In this way, any evidence of wear and deposits at these faces is removed without having to undo the workpieces from where they are built in and to dismantle them.

In apparatuses of this kind used hitherto, the diameter of the individual grinding or lapping heads is selected to be larger than the radial width of the annular face to be treated. This can make replacement of the tool heads necessary so as to adapt them to the particular surface to be treated.

It is the problem of the present invention to provide an apparatus of the aformentioned kind with a simple adjustment permitting tool heads to be used for the treatment of annular sealing faces having a radial width greater than the diameter of the tool heads.

This problem is solved according to the invention in an apparatus of the aforementioned kind in that the tool plate has a bearing hole which is offset from its mid-point and in which a circular bearing plate is adjustably mounted, a drive pin which is coupled to the transmission element being secured off-centre to the bearing plate for rotation therewith.

By setting the bearing plate in relation to the bearing hole of the tool plate, the fulcrum of the plate is changed. Consequently, the spacing of the individual tool axes from the rotary axis is varied. One can thus ensure that the individual tool heads turn on circular tracks of which the diameters are not equal. In this way, the tool heads can sweep over an annular sealing face of which the radial width is larger than the diameter of the tool heads.

This also results in an optimum grinding pattern with a high degree of planeness of the treated surface. The reason for this is that the grinding or lapping grooves intersect at a multiplicity of different angles.

The apparatus of the invention can be constructed so that the eccentricity of the bearing hole relatively to the centre of the tool plate is equal to the eccentricity of the point of engagement of the drive pin on the bearing plate in relation to this plate. By means of this arrangement, it is possible for setting purposes to arrange the point of engagement of the drive pin centrally of the tool plate.

Further, the apparatus can be constructed so that the bearing hole defines a shoulder abutted by a counter-shoulder of the bearing plate.

Finally, the construction may be such that the bearing plate is screw-connected to the tool plate. Tapped holes are provided in the bearing plate or in the tool plate and the respective other part is provided with corresponding push-through holes. It is then possible to offset the bearing plate in relation to the tool plate corresponding to the pitch of the screwthread. The eccentricity of the drive for the tool plate can be then changed in corresponding steps.

One example of the appartus of the invention will now be described with reference to drawings, wherein.

Figure 1:
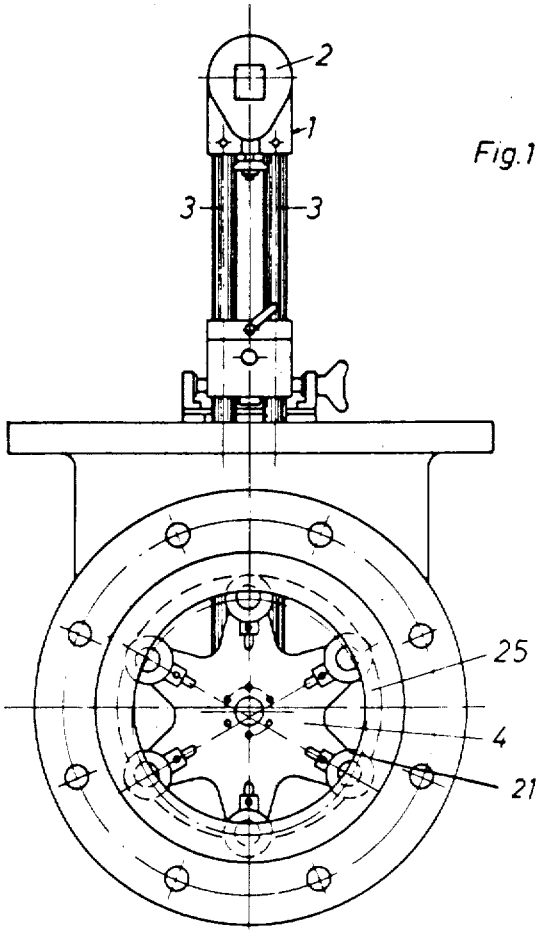
FIG. 1 is a side elevation of one embodiment of the apparatus according to the invention in conjunction with a valve housing to be machined.
Figure 2:
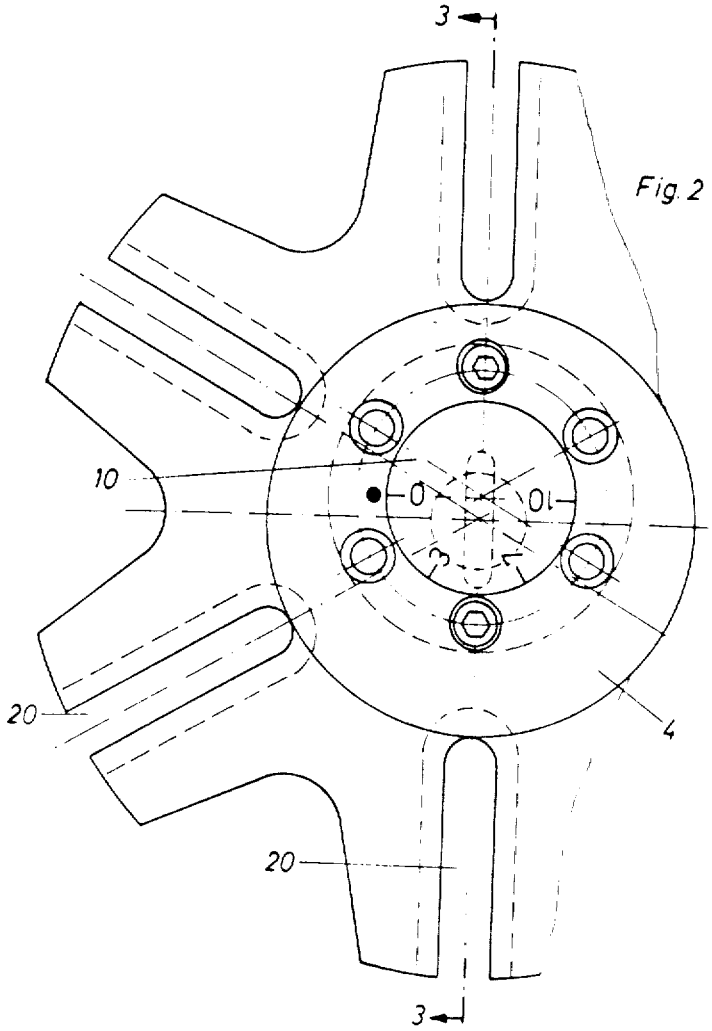
FIG. 2 is a fragmentary elevation of the tool plate according to the invention.
Figures 3, 4:
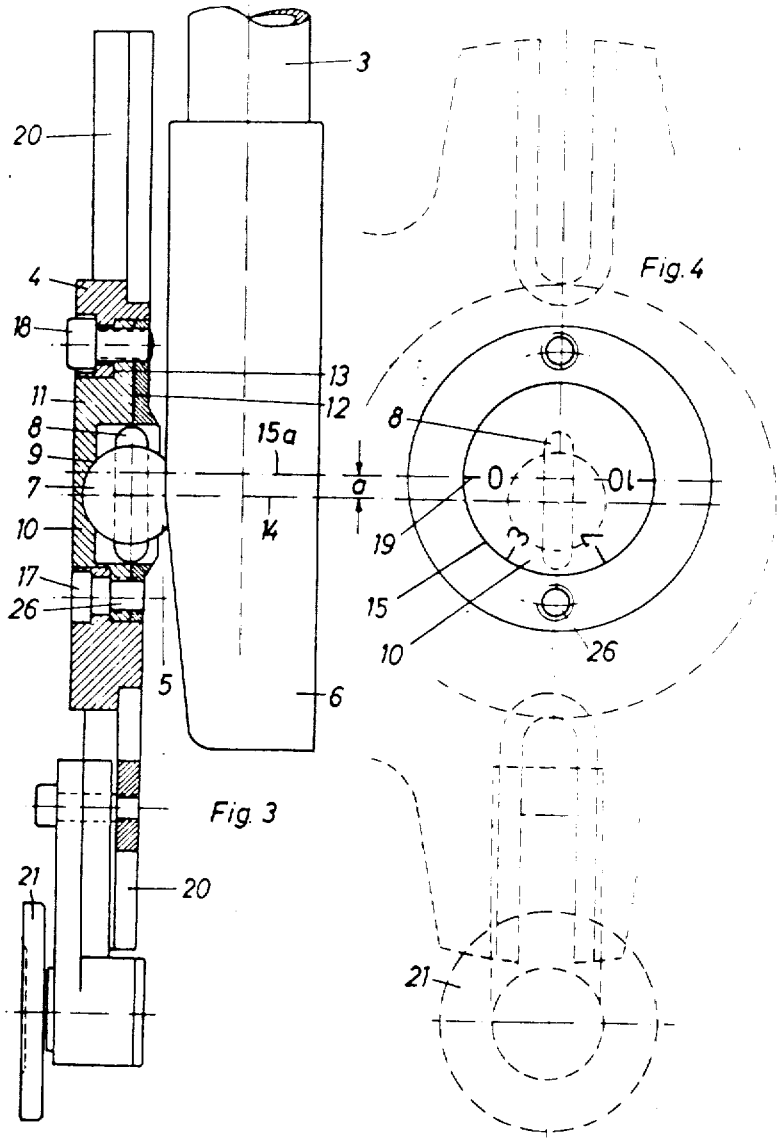
FIG. 3 is a section on the line 3—3 in FIG. 2, the mounting for the drive of the tool plate being indicated.
FIG. 4 is a fragmentary elevation of the tool plate taken in the direction of the arrow 4 in FIG. 3.

The apparatus of the invention comprises a mounting 1 by means of which it can be secured to a workpiece in a manner which need not here be described in detail, the workpiece having an annular sealing face 25 which is to be ground or lapped. The mounting 1 carries a drive 2 and comprises tubes 3 which connect the drive 2 to a tool plate 4. A transmission element (not shown) extends through the tubes 3 and transmits rotary motion from the drive 2 to a drive pin 5. The latter is mounted in a lower end member 6 of the mounting 1.

The drive pin 5 is spherical at the end 7 projecting from the end member 6 and equipped with two diametral pins 8 extending transversely to the axis of the drive pin 5. The pins 8 serve to transmit the rotary motion of the drive 2 and thus of the drive pin 5.

The spherical end 7 of the drive pin 5 engages in a corresponding pan 9 of a bearing 10. The pins 8 come to lie in complementary recesses of the pan 9.

The bearing plate 10 has a section 11 followed by a section 12 of larger diameter. The section 11 thus forms a radially projecting flange 13 and a shoulder in which tapped holes 26 are provided. The bearing plate 10 is circular, the axis of the pan 9 being offset by a distance a from the central axis 14 of the bearing plate 10.

The bearing plate 10 is received by a complementary bearing hole 15 in the hub zone of the substantially rotationally symmetrical tool plate 4. The axis 15a of the bearing hole 15 is offset by the distance a from the central axis 14 of tool plate 4. The tool plate 4 contains holes 17 for receiving screws 18 which engage in the tapped holes 26 of bearing plate 10.

After loosening the screws 18, the bearing plate 10 can be turned in the bearing hole 15. Depending on the pitch of the holes 17/26 or screws 18 arranged on a circle, the bearing plate 10 can be fixed by the screws 18 in a series of positions relatively to the tool plate 4.

The section 11 of the bearing plate 10 is provided with markings 19 which co-operate with opposite markings on the tool plate 4. These markings indicate when the bearing plate 10 is so arranged in relation to the tool plate 4 that the axis of the tool plate 4, i.e. the eccentricity is zero. The markings also permit the ecentricity of the drive shaft to be set in relation to the axis of the tool plate 4.

With a rotationally symmetric construction, the tool plate 4 is provided with radially extending grooves 20 for receiving freely rotatable lapping or grinding heads 21.

When the apparatus here in question is used, the bearing plate 10 is first set to zero eccentricity. At this setting, the tool plate 4 is aligned in position in relation to the annular sealing face 25 to be machined. Subsequently, the bearing plate 10 is turned in the bearing hole 15 to set the desired eccentricity so that the individual lapping or grinding heads 21 are differently spaced from the fulcrum of the tool plate 4.

I claim:

1. Apparatus for grinding and lapping annular sealing faces in valves, slides and the like, comprising a mounting securable to the workpiece and having on one side a drive and on the other side a rotable tool plate which is coupled to the drive by a tranmission element and carries a series of freely rotatable grinding or lapping heads with axes parallel to the tool plate axis, the heads being radially adjustable relatively to the tool plate, the tool plate (4) has a bearing hole (15) which is offset from its mid-point and in which a circular bearing plate (10) is adjustably mounted, a drive pin (5) which is coupled to the transmission element being secured off-centre to the bearing plate for rotation therewith.

2. Apparatus according to claim 1, wherein the eccentricity of the bearing hole (15) relatively to the centre of the tool plate (4) is equal to the eccentricity of the point of engagement of the drive pin (5) on the bearing plate (10) in relation to this plate.

3. Apparatus according to claim 1 or claim 2, wherein the bearing hole (5) defines a shoulder (13) abutted by a counter-shoulder of the bearing plate (10).

4. Apparatus according to claim 1 wherein the bearing plate (10) is screw-connected to the tool plate (4).

5. Apparatus according to claim 1 or 2 wherein the bearing plate is screw-connected to the tool plate.

*6. Apparatus for grinding and lapping annular sealing faces in valves, slides and the like, said apparatus comprising:*

*a mounting structure securable to a workpiece;*

*drive mechanism including a rotary drive pin carried by the structure;*

*a rotatable tool plate carried by the structure;*

*a series of freely rotatably grinding or lapping heads carried by said tool plate with their axes of rotation parallel to the axis of rotation of the plate, said heads being radially shiftable relative to the plate;*

*said plate having a bearing hole therein;*

*a circular bearing plate rotatably mounted in said bearing hole;*

*a joint interconnecting said drive pin and said bearing plate for rotation of the plate with the pin;*

*the point of connection between said drive pin and said plate being offset relative to the center of the bearing plate.*

*7. Apparatus as set forth in claim 6 wherein said bearing hole is offset from the axis of rotation of the tool plate.*

*8. Apparatus as set forth in claim 7 wherein the offset of the bearing hole relative to the mid-point of the tool plate is equal to the offset of the said point of connection relative to the center of the bearing plate.*

*9. Apparatus as set forth in claim 6 wherein said joint comprises a universal joint.*

*10. Apparatus as set forth in claim 9 wherein said joint comprises interengaged ball and socket elements.*

*11. Apparatus for grinding and lapping annular sealing faces in valves, slides and the like, said apparatus comprising:*

*means for mounting the apparatus on a workpiece;*

*a drive mechanism including a rotatable drive pin;*

*a tool plate mounted for rotation about an axis which extends through the plane of the plate, said plate having a bearing hole therein which is offset from said axis;*

*a series of freely rotatably grinding or lapping heads mounted on the plate for rotation about individual axes which are esentially perpendicular to the plane of the plate;*

*a bearing plate adjustably mounted in said hole and securable thereto for rotation together with the tool plate about said axis; and*

*means operably connecting the drive pin and the bearing plate for rotation together, the point of connection on the bearing plate being offset relative to the center of the hole.*

*12. Apparatus as set forth in claim 11 wherein said bearing hole and said bearing plate are circular, said plate being mounted for rotation in said hole for accomplishing said adjustment.*

*13. Apparatus as set forth in claim 10 wherein said means for connecting the transmission element and the bearing plate comprises a universal joint.*

*14. Apparatus as set forth in claim 13 wherein said bearing hole and said bearing plate are circular, said plate being mounted for rotation in said hole for accomplishing said adjustment.*

*15. Apparatus as set forth in claim 13 wherein said universal joint comprises interengaged ball and socket elements.*

*16. Apparatus for grinding and lapping annular sealing faces in valves, slides and the like, said apparatus comprising:*

*a mounting structure securable to a workpiece;*

*drive mechanism including a rotary drive pin carried by the structure;*

*a rotatable tool plate carried by the structure;*

*a series of freely rotatably grinding or lapping heads carried by said tool plate with their axes of rotation parallel to the axis of rotation of the plate;*

*said plate having a bearing hole therein, said hole being offset from the axis of rotation of the plate;*

*a circular bearing plate rotatably mounted in said bearing hole;*

*a joint interconnecting said drive pin and said bearing plate for rotation of the plate with the pin;*

*the point of connection between said drive pin and said plate being offset relative to the center of the bearing plate.*

* * * * *